(12) United States Patent
Fiseni et al.

(10) Patent No.: US 11,371,964 B2
(45) Date of Patent: Jun. 28, 2022

(54) CONDITION MONITORING OF ULTRASONIC TRANSDUCERS AND PROBES

(71) Applicant: GE Sensing & Inspection Technologies, GmbH, Huerth (DE)

(72) Inventors: Alexander Fiseni, Hurth (DE); Stephan Schmitz, Hurth (DE); Christof Breidenbach, Hurth (DE); Stephan Falter, Hurth (DE); Daniel Koers, Hurth (DE); Marek Parusel, Hurth (DE); Lars Rohpeter, Hurth (DE); Sven Runte, Hurth (DE); Sebastian Standop, Hurth (DE)

(73) Assignee: GE SENSING & INSPECTION TECHNOLOGIES, GMBH, Hurth (DE)

( * ) Notice: Subject to any disclaimer, the term of this patent is extended or adjusted under 35 U.S.C. 154(b) by 222 days.

(21) Appl. No.: 16/429,397

(22) Filed: Jun. 3, 2019

(65) Prior Publication Data

US 2019/0369058 A1 Dec. 5, 2019

Related U.S. Application Data

(60) Provisional application No. 62/680,330, filed on Jun. 4, 2018.

(51) Int. Cl.
| | | |
|---|---|---|
| *G01N 29/30* | (2006.01) | |
| *G01N 27/02* | (2006.01) | |
| *G01N 29/265* | (2006.01) | |
| *G01N 29/28* | (2006.01) | |
| *G01N 29/34* | (2006.01) | |
| *G01N 29/44* | (2006.01) | |

(52) U.S. Cl.
CPC ............. *G01N 29/30* (2013.01); *G01N 27/02* (2013.01); *G01N 29/265* (2013.01); *G01N 29/28* (2013.01);

(Continued)

(58) Field of Classification Search
CPC ...... G01N 29/30; G01N 29/265; G01N 29/28; G01N 29/343; G01N 29/346;

(Continued)

(56) References Cited

U.S. PATENT DOCUMENTS

| | | |
|---|---|---|
| 6,883,362 B2 | 4/2005 | Ogawa |
| 7,993,056 B2 | 8/2011 | Amemiya |

(Continued)

FOREIGN PATENT DOCUMENTS

| | | |
|---|---|---|
| EP | 1624291 A2 | 2/2006 |
| EP | 2735270 A1 | 5/2014 |

(Continued)

OTHER PUBLICATIONS

International Search Report and Written Opinion issued in corresponding International Application No. PCT/IB2019/000693, dated Mar. 3, 2020, 15 pages.

*Primary Examiner* — Peter J Macchiarolo
*Assistant Examiner* — John M Royston
(74) *Attorney, Agent, or Firm* — Mintz Levin Cohn Ferris Glovsky and Popeo, P.C.; Lisa Adams

(57) ABSTRACT

Systems and methods for monitoring the condition of ultrasonic transducers and ultrasonic probes used in non-destructive testing are provided. In one aspect, a degree of deterioration and end of life of an ultrasonic transducer can be estimated based upon measured environmental and/or operating parameters of the ultrasonic transducer. In another aspect, testing parameters acquired by a single ultrasonic probe or different ultrasonic probes can be measured and analyzed to identify deterioration of an ultrasonic probe.

10 Claims, 8 Drawing Sheets

(52) U.S. Cl.
CPC ......... *G01N 29/343* (2013.01); *G01N 29/346* (2013.01); *G01N 29/4436* (2013.01); *G01N 2291/044* (2013.01); *G01N 2291/048* (2013.01); *G01N 2291/101* (2013.01); *G01N 2291/105* (2013.01)

(58) Field of Classification Search
CPC ............... G01N 29/4436; G01N 29/11; G01N 29/4427; G01N 27/02; G01N 2291/044; G01N 2291/048; G01N 2291/101; G01N 2291/105; G01N 2291/0258; G01S 7/52004
See application file for complete search history.

(56) References Cited

U.S. PATENT DOCUMENTS

| | | |
|---|---|---|
| 8,084,922 B2 | 12/2011 | Fukase et al. |
| 9,151,649 B2 | 10/2015 | Ramsay |
| 2010/0016720 A1 | 1/2010 | Iwasaki |
| 2013/0261461 A1* | 10/2013 | Murakami ............... A61B 8/12 600/443 |
| 2016/0370334 A1* | 12/2016 | van Tol ................ G01D 18/002 |
| 2020/0150093 A1* | 5/2020 | Hallevall ........... G01N 29/2437 |

FOREIGN PATENT DOCUMENTS

| | | | |
|---|---|---|---|
| JP | 2012 139460 A | | 7/2012 |
| JP | 2012139460 A | * | 7/2012 |

* cited by examiner

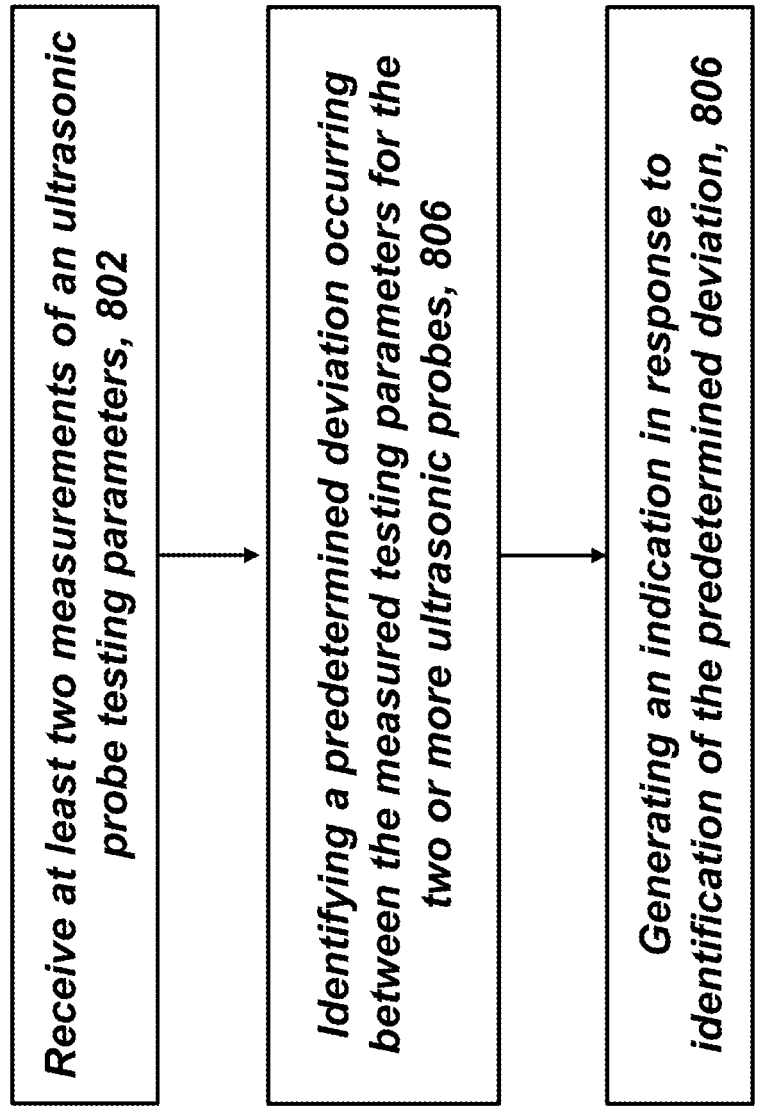

CONDITION MONITORING OF ULTRASONIC TRANSDUCERS AND PROBES

CROSS-REFERENCE TO RELATED APPLICATIONS

This application claims the benefit of U.S. Provisional Patent Application No. 62/680,330, filed Jun. 4, 2018, entitled "Condition Monitoring of Ultrasonic Transducers and Probes," the entirety of which is incorporated herein by reference.

BACKGROUND

In some instances, non-destructive testing (NDT) is a class of analytical techniques that can be used to inspect characteristics of a target, without causing damage, to ensure that the inspected characteristics satisfy required specifications. For this reason, NDT can be used in a number of industries such as aerospace, power generation, oil and gas transport or refining. NDT can be useful in industries that employ structures that are not easily removed from their surroundings (e.g., pipes or welds) or where failures would be catastrophic.

Ultrasonic testing is one type of NDT. Ultrasound is acoustic (sound) energy in the form of waves that have an intensity (strength) which varies in time at a frequency above the human hearing range. In ultrasonic testing, an ultrasonic probe can generate one or more ultrasonic waves and these waves can be directed towards a target in an initial pulse. As the ultrasonic waves contact and penetrate the target, they can reflect from features such as outer surfaces and interior defects (e.g., cracks, porosity, etc.). The ultrasonic probe can also acquire ultrasonic measurements, acoustic strength as a function of time, that characterize these reflected ultrasonic waves. Subsequently, ultrasonic measurements can be analyzed to determine target characteristics.

SUMMARY

However, over time, wear and deterioration of the mechanical and electrical components of the ultrasonic probe can be observed. As an example, mechanical deterioration can occur to an exterior housing due to deployment in aggressive environments that include corrosive and/or contaminated liquids which directly contact the ultrasonic probe. Alternatively or additionally, electrical deterioration of the ultrasonic transducers can occur due to substantially continuous operation for long durations (e.g., 24 hours/7 days a week).

A method for condition monitoring of an ultrasonic device is provided. The method can include receiving, at an analyzer, at least one environmental signal including data characterizing measurements of one or more environmental parameters of an ultrasonic transducer acquired by one or more sensors. The method can also include receiving, at the analyzer, at least one operating signal including data characterizing measurements of one or more operating parameters of the ultrasonic transducer. The method can further include estimating, by the analyzer, a degree of deterioration of the transducer based upon the received environmental parameters and operating parameters. The method can also include generating, by the analyzer, an indication when at least one of the measured environmental parameters, the measured operating parameters, and the determined degree of deterioration exceeds a predetermined threshold.

In another embodiment, the method can also include measuring the one or more environmental parameters.

In another embodiment, the environmental parameters can include at least one of temperature of the ultrasonic transducer, pressure of the ultrasonic transducer, vibration of the ultrasonic transducer, shock experienced by the ultrasonic transducer, and humidity of the ultrasonic transducer.

In another embodiment, the one or more operating parameters can include at least one of an operating time of the ultrasonic transducer, a storage time of the ultrasonic transducer, and one or more electrical properties of the ultrasonic transducer.

In another embodiment, the electrical properties can include at least one of an electrical impedance of the ultrasonic transducer and an initial pulse received by of the ultrasonic transducer.

In another embodiment, the operating parameter measurements can include one or more ultrasonic scans of the ultrasonic transducer acquired by an ultrasonic probe that does not include the ultrasonic transducer.

In another embodiment, the method can also include measuring the one or more operating parameters.

In another embodiment, the method can also include directing an air stream on one or more surfaces of a housing enclosing the ultrasonic transducer prior to measuring the one or more operating parameters.

In another embodiment, the analyzer is configured to estimate the degree of deterioration by input of the received environmental parameters and operating parameters into a deterioration model.

In another embodiment, the deterioration model includes an aging model.

In another embodiment, the ultrasonic transducer includes at least two ultrasonic transducers spaced apart from one another and configured to emit incident signals having a predetermined phase difference based upon their relative positions.

A method is provided for condition monitoring of an ultrasonic probe. Embodiments of the method can include receiving, at a condition monitor, a first signal. The first signal can include data characterizing current measurements of a predetermined ultrasonic testing parameter as a function of time acquired by a first ultrasonic probe. The method can also include receiving, at the condition monitor, a second operating signal. The second operating signal can include at least one of data characterizing prior measurements of the predetermined testing parameter as a function of time acquired by the first ultrasonic probe and data characterizing current or prior measurements of the predetermined testing parameter as a function of time acquired by one or more second ultrasonic probes, different from the first ultrasonic probe. The method can also include identifying, by the condition monitor, a predetermined deviation occurring between the measured testing parameter characterized by the first and second operating signals. The method can further include generating, by the condition monitor, an indication in response to identification of the predetermined deviation.

In another embodiment, the predetermined testing parameter can be a probe amplification.

In another embodiment, the predetermined testing parameter can be a number of flaws counted.

In another embodiment, the predetermined testing parameter can be an average amplitude of measured return ultrasonic signals.

In another embodiment, the predetermined testing parameter can include two or more of: a probe amplification, a number of flaws counted, and an average amplitude of measured return ultrasonic signals.

In another embodiment, the predetermined deviation can be a difference exceeding a threshold amount between the measured testing parameter characterized by the first and second operating signals.

In another embodiment, the predetermined deviation can be a difference exceeding a threshold amount between respective trend lines of the measured testing parameter characterized by the first and second operating signals

BRIEF DESCRIPTION OF THE DRAWINGS

These and other features will be more readily understood from the following detailed description taken in conjunction with the accompanying drawings, in which:

FIG. 8 is a flow diagram illustrating another exemplary embodiment of a method for condition monitoring of an ultrasonic device.

It is noted that the drawings are not necessarily to scale. The drawings are intended to depict only typical aspects of the subject matter disclosed herein, and therefore should not be considered as limiting the scope of the disclosure. Those skilled in the art will understand that the systems, devices, and methods specifically described herein and illustrated in the accompanying drawings are non-limiting exemplary embodiments and that the scope of the present invention is defined solely by the claims.

DETAILED DESCRIPTION

Ultrasonic probes can be used for non-destructive testing and can include ultrasonic transducers that are configured to transmit and/or receive ultrasonic waves. The strength of ultrasonic waves reflected from material features (e.g., boundaries, flaws, etc.), as well as the amount of time that elapses between transmitting an ultrasonic wave and receiving the reflected ultrasonic wave, can vary depending on the type of material, the location of the material features with respect to the ultrasonic transducer, and/or the shape of the material feature. Thus, ultrasonic testing systems can use ultrasonic transducers to measure the strength and time behavior of reflected ultrasonic waves to characterize material features (e.g., location, size, shape, etc.). However, after repeated use, the performance of ultrasonic transducers can degrade due to damage induced by the environment (e.g., temperature, pressure, humidity, vibration, impact/shock, wear) and/or chemical attack (e.g., corrosion), amongst others. Accordingly, systems and methods for monitoring the condition of ultrasonic transducers and ultrasonic probes used in non-destructive testing are provided. In one aspect, a degree of deterioration and end of life of an ultrasonic transducer can be determined based upon models employing measurements of environmental parameters experienced by the ultrasonic transducer and/or operating parameters (e.g., time of use, electrical properties, etc.) of an ultrasonic transducer. In another aspect, measurements presently acquired by an ultrasonic probe can be compared to historical measurements acquired by that ultrasonic probe and/or measurements acquired by one or more other ultrasonic probes (currently or historically). When the determined degree of deterioration exceeds a threshold amount, an indication (e.g., an alarm or other warning), can be generated to alert an operator of the deterioration. In this manner, deteriorating ultrasonic probes can be identified and, if necessary, replaced to ensure accuracy of ultrasonic probe measurements.

Embodiments of systems and corresponding methods for condition monitoring of ultrasonic probes and ultrasonic probe transducers are discussed herein. However, embodiments of the disclosure can be employed for analysis of other testing devices without limit.

Figure 1:
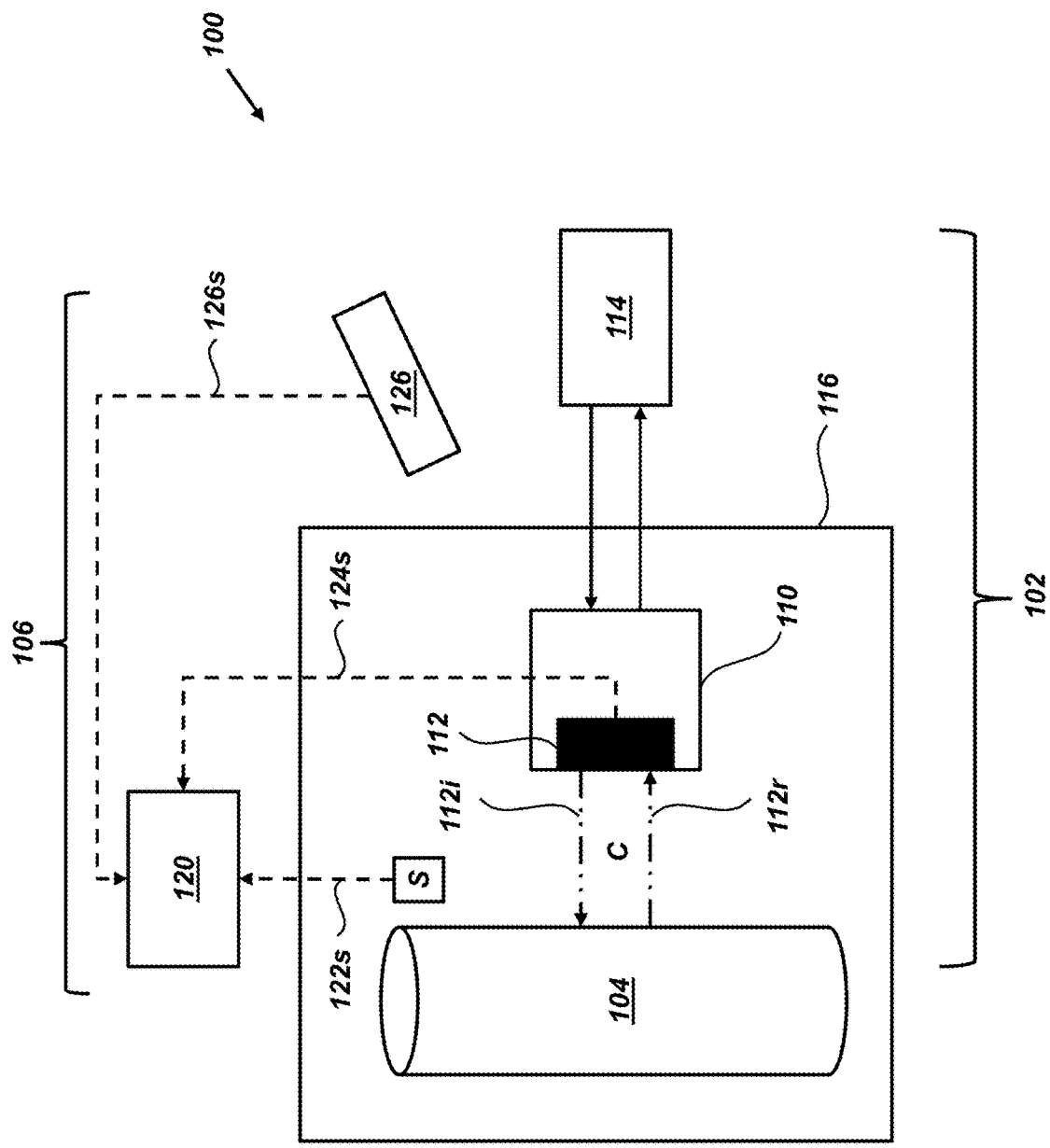
FIG. 1 is a diagram illustrating one exemplary embodiment of an operating environment including a condition monitoring system configured to monitor a condition of an ultrasonic device.

Condition Monitoring Based Upon Environmental Parameters, Operational Parameters, and/or Degree of Deterioration FIG. 1 illustrates one exemplary embodiment of an operating environment 100 containing an ultrasonic testing system 102 configured to perform non-destructive testing of a target 104 and a condition monitoring system 106. The ultrasonic testing system 102 can include an ultrasonic probe 110 containing one or more ultrasonic transducers 112. The ultrasonic testing system 102 can also include a diagnostic device 114. As discussed in greater detail below, the condition monitoring system 106 can be configured to monitor deterioration of the ultrasonic transducers 112.

The ultrasonic transducers 112 can be configured to generate ultrasonic waves that penetrate the target 104 at a selected angle and strength (e.g., ultrasonic amplitude or intensity), referred to herein as incident signals 112$i$. The ultrasonic transducers 112 can also be configured to detect ultrasonic waves reflected back to the ultrasonic transducers 112 from the target 104, referred to herein as return signals 112$r$. In certain embodiments, the ultrasonic transducers can include one or more ultrasonic transmitters configured to generate the incident ultrasonic signals and one or more ultrasonic receivers configured to receive the return signals. In other embodiments the ultrasonic transducers can include one or more ultrasonic transceivers, each configured to both generate the incident ultrasonic signals and receive the return signals. In additional embodiments, the ultrasonic probe can include two or more ultrasonic transducers in the form of a phased array, where at least two ultrasonic transducers are spaced apart from one another and configured to emit incident signals having a predetermined phase difference.

In use, the ultrasonic probe 110 can be positioned proximate to the target 104 (e.g., in contact with or near the target 104) for directing incident signals 112$i$ towards the target 104 and measuring return signals 112$r$. In certain embodiments, the target 104 and the ultrasonic probe 110 can be placed in a substantially fluid-tight chamber 116 containing a fluid couplant C (e.g., oil, water, etc.) to facilitate propagation of the incident and return signals 112$i$, 112$r$. In other embodiments, the fluid couplant C can be omitted. The diagnostic device 114 can be configured to receive data characterizing measurements of the return signal 112r from the ultrasonic probe 110 and it can display the return signal 112r as a pulse having an amplitude as a function of time. The amplitude can represent the intensity (strength) of the return signal 112r and the time can represent the arrival time of the return signal 112r at the ultrasonic transducers 112. Alternatively, the amplitude can be represented as a function of distance between the ultrasonic transducers 112 and a feature of the target 104 from which the return signal 112r is reflected. In this manner, characteristics of the target 104, such as external surfaces (e.g., dimensions) and internal surface (e.g., size, orientation, and/or position of any of cracks, boundaries between different materials, external surfaces, etc.) can be determined from the ultrasonic measurements.

The condition monitoring system 106 can be configured to measure at least one of environmental parameters and operating parameters of the ultrasonic probe 110 and/or ultrasonic transducers 112. In one aspect, the condition monitoring system 106 can include one or more sensors S configured to measure the one or more environmental parameters and to transmit environmental signals 122s to the analyzer 120. The environmental signals 122s can include data characterizing the measured environmental parameter measurements. The environmental parameters can include, but are not limited to, temperature, pressure, vibration, impact/shock, and humidity (e.g., inside the ultrasonic probe 110).

In another aspect, the analyzer 120 can be in communication with each of the ultrasonic transducers 112 and the analyzer 120 can receive operating signals 124s from at least one of the ultrasonic transducers 112 that includes data characterizing one or more of its operating parameters. Examples of the operating parameters can include, but are not limited to, operation time, storage time, chronological age, and one or electrical properties.

Operation time and storage time of an ultrasonic transducer 112 can reflect overall use or lack of use over its service life. In one aspect, the operation time can be a cumulative time during which the ultrasonic transducer 112 receives electrical power for operation. In another aspect, the storage time can be a cumulative time during which the ultrasonic transducer 112 does not receive electrical power for operation. Chronological age can represent the time elapsed from a predetermined event, such as manufacture, initial use, or refurbishment of an ultrasonic transducer 112. In certain embodiments, the ultrasonic probe 110 can include one or more time keeping devices configured to receive electrical power from mains and/or an independent power supply (e.g., a battery) for measurement of one or more of the operation time, the storage time, and chronological age. That is, measurements of one or more of the operation time, the storage time, and chronological age of the ultrasonic transducers 112 can be acquired substantially continuously throughout its service life.

Electrical properties of the ultrasonic transducers 112 can include, but are not limited to, electrical impedance and initial pulse. In certain embodiments, the initial pulse can be characteristics describing an electrical pulse applied to excite a given one of the ultrasonic transducers 112 (e.g., amplitude, time, shape, etc.). In further embodiments, electrical properties of an ultrasonic transducer 112 can be independently measured during and/or after an ultrasonic testing cycle is completed.

In further embodiments, the operating parameters can include one or more ultrasonic scans characterizing a physical condition of an ultrasonic transducer 112. As an example, the condition monitoring system 106 can be configured to receive ultrasonic scans (e.g., ultrasonic A-scans) of one or more ultrasonic transducers 112 at different times (e.g., at predetermined time intervals). These ultrasonic scans can be acquired by one or more ultrasonic probes 126, different than the ultrasonic probe 110 containing the ultrasonic transducers 112 under examination. Signals 126s including data characterizing the ultrasonic scans can be transmitted from the ultrasonic probes 126 to the analyzer 120. Changes between the ultrasonic scans (e.g., structural changes such as flaw development, etc.) can be characterized by the analyzer 120 and employed for conditioning monitoring of the ultrasonic transducers 112.

Embodiments of the ultrasonic testing system 102 and the condition monitoring system 106 can be varied from the configuration illustrated in FIG. 1. In one aspect, the analyzer can receive the measured operating parameters of the ultrasonic transducers from the diagnostic device or another storage device, rather than directly from the transducers. That is, the ultrasonic transducers can transmit the measured operating parameters to the diagnostic device or storage device and the diagnostic device can subsequently transmit the measured operating parameters to the analyzer. In another aspect, the analyzer can be integrated with the diagnostic device.

Figure 2:
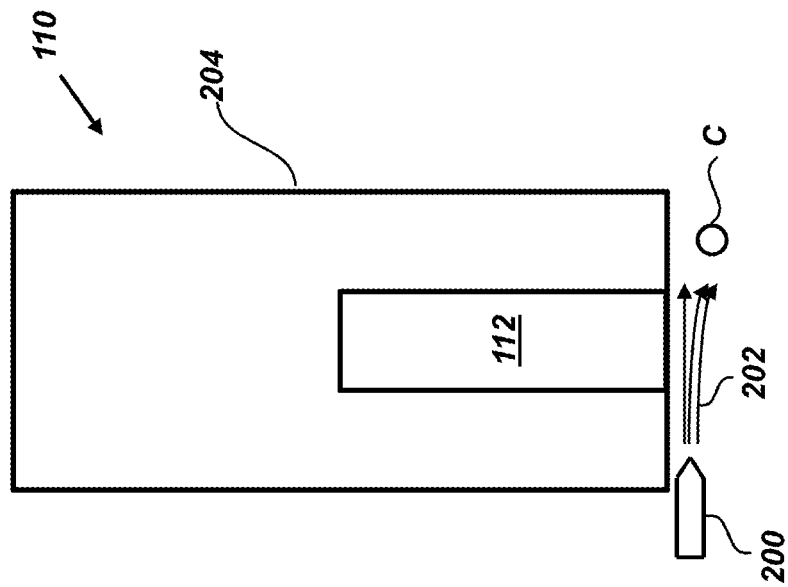
FIG. 2 is a diagram illustrating a cross-sectional view of the ultrasonic probe of FIG. 1 and an air stream utilized to clean one or more exterior surfaces of the ultrasonic probe.

At least one of the electrical property measurements and ultrasonic scans of the ultrasonic transducers 112 by ultrasonic probe 126 can be acquired in a defined test environment. In an example, after ultrasonic testing is completed, the fluid couplant C can be drained from the chamber 116 and residual fluid couplant C can be cleaned from the surface of the ultrasonic probe 110 (e.g., a housing of the ultrasonic probe). As shown in FIG. 2, a nozzle 200 can be employed to direct an air stream 202 on one or more surfaces of a housing 204 of the ultrasonic probe 110 (e.g., a surface adjacent to the ultrasonic transducer 112). In this manner, fluid couplant C that could undesirably reflect ultrasonic echoes when acquiring electrical properties measurements of the ultrasonic transducers 112 and/or ultrasonic scans of the ultrasonic transducers 112 can be removed from one or more surfaces of the ultrasonic probe 110. That is, the air stream 202 can be directed on one or more surfaces of the ultrasonic probe 110 and, subsequently, operating parameter measurements can be acquired.

The condition monitoring system 106 (e.g., the analyzer 120) can also be configured to estimate a degree of deterioration of one or more of the ultrasonic transducers 112. In certain embodiments, the analyzer 120 can estimate the degree of deterioration using a deterioration model. The deterioration model can account for selected mechanisms by which deterioration of the ultrasonic probe can occurs and can pass through different stages of failure (e.g., early-life, mid-life, and late-life). The deterioration model can utilize one or more of the measured environmental parameters, the measured operating parameters, and changes in the ultrasonic transducers 112 determined from ultrasonic scans as inputs. As discussed above, the environmental parameters can include one or more of temperature, pressure, vibration, impact/shock, and humidity (e.g., inside the ultrasonic probe 110). The operating parameters can include one or more of operation time, storage time, chronological age, and one or electrical properties.

As an example, a deterioration model can be configured to provide one or more of the following: an anticipated rate of deterioration of the ultrasonic transducer, a path of deterioration (e.g., a shape of the deterioration-time plot), thresholds defining the beginning and end of each stage of failure, and a probability of failure as a function of time. In certain embodiments, the degree of deterioration can be represented as a percentage, where 0% indicates substantially no deterioration and 100% represents substantially complete deterioration.

In certain embodiments, the deterioration model can include an aging model. An aging model can be time variant and it can sum up the effects of environmental phenomena acting on an ultrasonic transducer over time. The analyzer 120 can be configured to determine the degree of deterioration as a percentage of a value of a container that sums up aging effects to a maximum value. As an example, if the ratio of the current container value to the maximum container value is 0.6, a degree of deterioration can be 60%.

One exemplary embodiment of an aging model is illustrated below. As shown, aging associated with environmental effects can be accounted for as a product of an elapsed time ($\Delta T$), such as operation time, and predetermined weighting factors that correspond to specific environmental parameters. The container is filled by aging effects associated with temperature, pressure, humidity, time (e.g., chronological age), and shock/impact. The container maximum value is 1000.

Container_$t0$=0

Container_$t+1$=Temperature_factor*$\Delta T$+
Pressure_factor*$\Delta T$+Humidity_factor*$\Delta T$+
Time_factor*$\Delta T$+Shock_factor*$\Delta T$ End of life is reached if Container t+1=1000
A lookup table containing exemplary weighting factors as a function of temperature ("Temperature_factor") are illustrated below in Table 1.

TABLE 1

Temperature factors For Aging Model

| Temperature [° C.] | Temperature_factor |
| --- | --- |
| −10 | 0.05 |
| 0 | 0.03 |
| 10 | 0 |
| 20 | 0 |
| 30 | 0 |
| 40 | 0.03 |
| 50 | 0.05 |
| 60 | 1 |

The temperature lookup table, as well as lookup tables corresponding to the remaining environmental parameters, can be maintained by the analyzer 120 and/or received from another computing device in communication with the analyzer 120 (e.g., the diagnostic device 114, another a data storage device, etc.).

The analyzer 120 can also be configured to store, display, and/or transmit the estimated degree of deterioration as a function of time. As an example, the analyzer 120 can be configured to transmit the estimated degree of deterioration as a function of time to the diagnostic device 114 or another computing device.

The analyzer 120 can be configured to compare a selected one of the measured environmental parameters, the measured operational parameters, and the estimated degree of deterioration to at least one predetermined criterion. In certain embodiments, this comparison can be performed by the analyzer 120 concurrently with acquisition of the measured environmental parameters and the measured operational parameters, referred to as online analysis. In other embodiments, this comparison can be performed by the analyzer 120 after acquisition of the measured environmental parameters and the measured operational parameters, referred to as offline analysis.

In one embodiment, the predetermined criterion can be a threshold value corresponding to the selected one of the measured environmental parameters, the measured operational parameters, and the estimated degree of deterioration. As an example, the analyzer 120 can compare the degree of deterioration to a predetermined deterioration threshold. The deterioration threshold can be received by the analyzer 120 in a variety of ways. In one aspect, the deterioration threshold can be received by the analyzer 120 via input from a user. In another embodiment, the deterioration threshold can be received by the analyzer 120 from another computing device (e.g., the diagnostic device 114) or a data storage device (not shown)) in communication with the analyzer 120.

Figure 3:
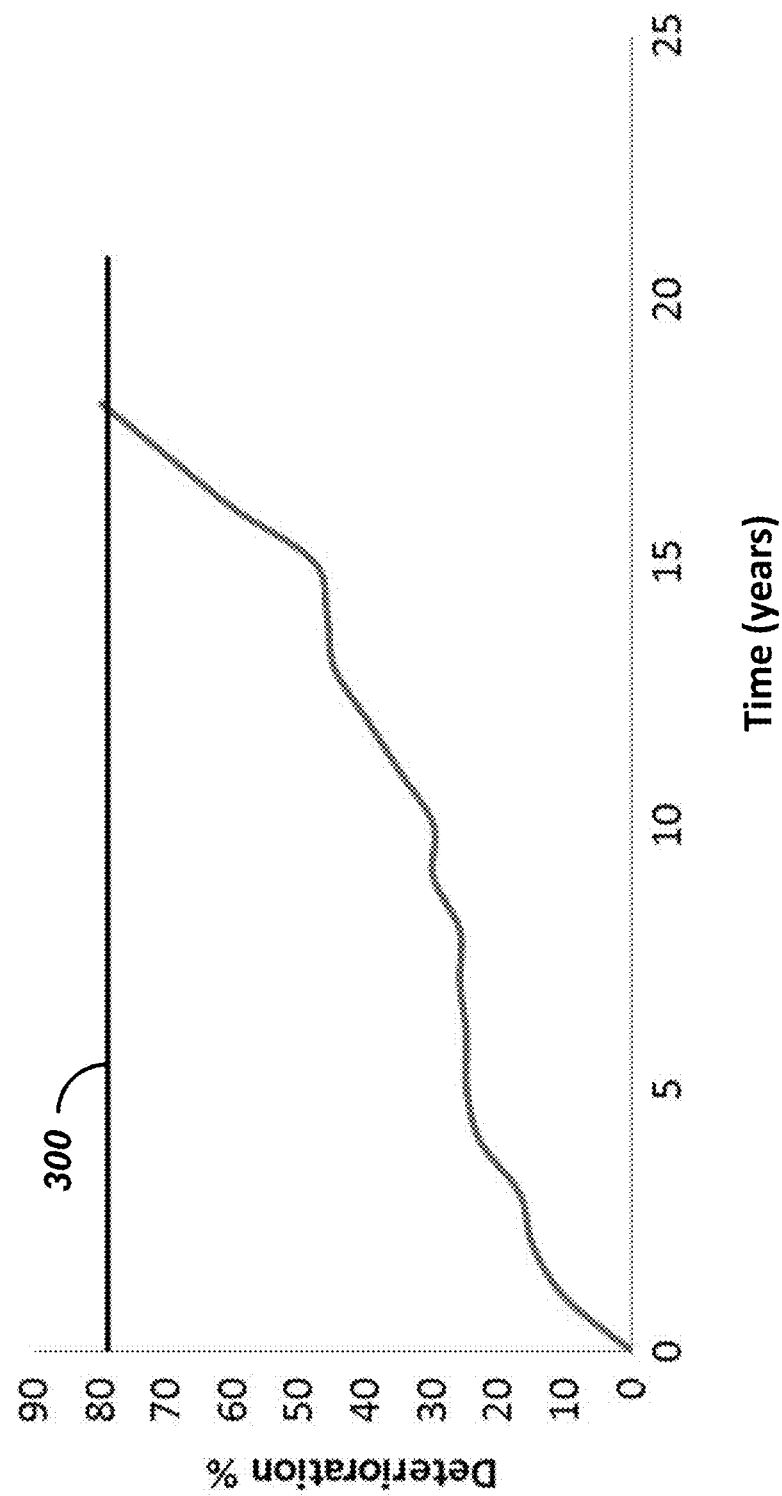
FIG. 3 is an plot illustrating a degree of deterioration of an ultrasonic transducer as a function of time.

An exemplary plot of degree of deterioration as a function of time is illustrated in FIG. 3. As shown, a line representing a predetermined deterioration threshold 300 (e.g., about 80%) is superimposed thereon.

Embodiments of the analyzer 120 can be configured to generate an indication based upon one or more of the above-discussed comparisons (e.g., between a selected one of the measured environmental parameters, the measured operational parameters, and the estimated degree of deterioration with a corresponding predetermined criterion). The indication can include one or more of alphanumeric text (e.g., an entry in a log file or data structure such as a database), an audible indication (e.g., an audible alarm), and a visual indication (e.g., a flashing light). In certain embodiments, the condition monitor can store, display, and/or annunciate the indication. In other embodiments, the condition monitor can transmit the indication to another system for storage, display and/or annunciation.

In one aspect, the analyzer 120 can generate the indication when at least one of the measured environmental parameters, the measured operating parameters, and the determined degree of deterioration exceeds its corresponding predetermined threshold.

The analyzer 120 can also be configured to estimate a health status and end of life (EoL) for one or more of the ultrasonic transducers 112 by using a predictive failure model. The predictive failure model can utilize one or more of the measured environmental parameters, the measured operating parameters, and changes in the ultrasonic transducers 112 determined from ultrasonic scans as inputs.

Figure 4:
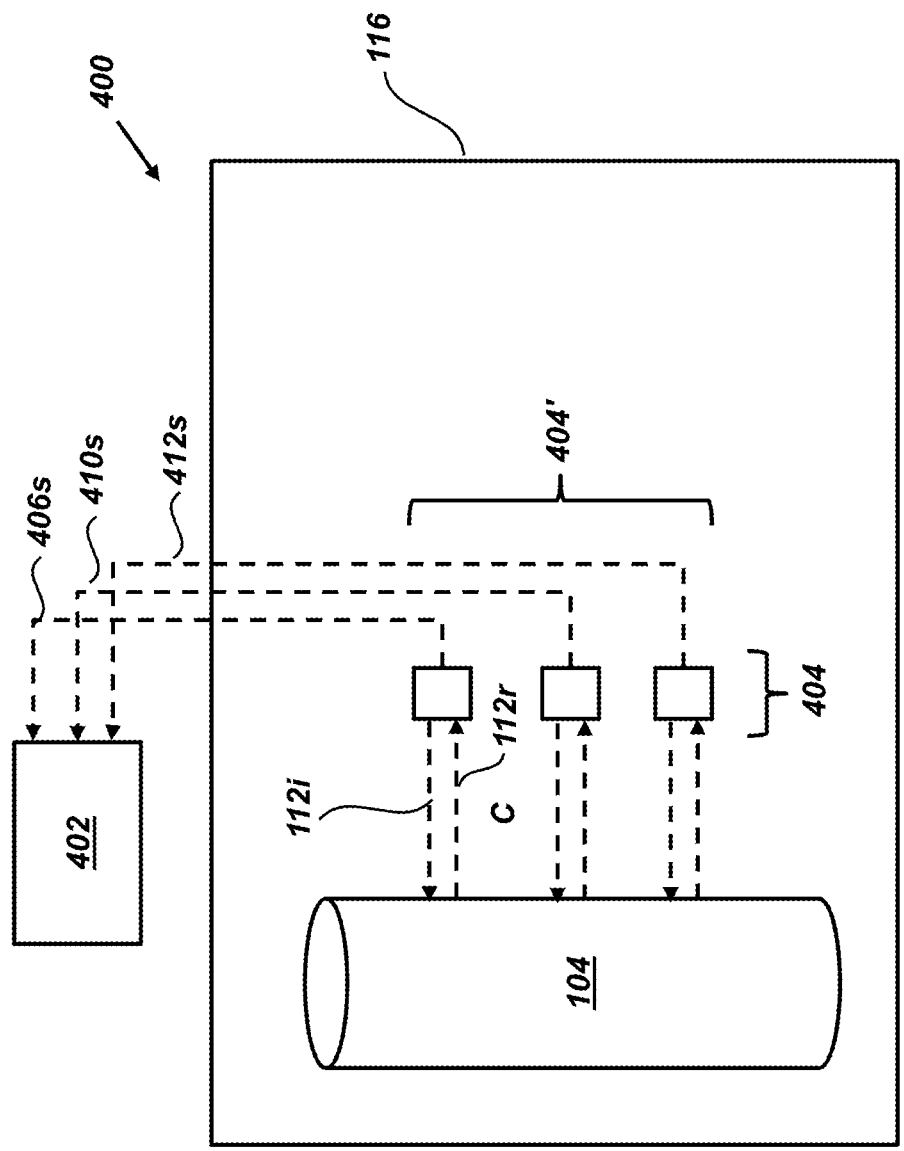
FIG. 4 is a diagram illustrating another exemplary embodiment of an operating environment including a condition monitor configured to monitor a condition of an ultrasonic probe.

Condition Monitoring Based Upon Testing Parameters Acquired by Ultrasonic Probes In alternative embodiments, condition monitoring systems can be provided to track ultrasonic probe deterioration based upon testing parameters acquired during calibration and/or operation of one or more ultrasonic probes 404. FIG. 4 is a diagram illustrating one exemplary embodiment of an operating environment 400 that includes a condition monitoring system including a condition monitor 402 configured to track deterioration of one or more ultrasonic probes 404. In certain embodiments, the ultrasonic probes 404 can be part of a series of two or more ultrasonic probes 404'. Each of the ultrasonic probes 404 can be substantially the same as ultrasonic probe 110 discussed above. As shown in FIG. 4, the series of ultrasonic probes 404' can be employed to characterize substantially the entire volume of the target 104 using incident signals 112$i$ and return signals 112$r$. The ultrasonic probes 404 can also be in communication with a diagnostic device, such as diagnostic device 114, not shown. In certain embodiments, the condition monitor 402 can be integrated with diagnostic device.

As discussed in detail below, the condition monitor 402 can be configured to receive testing parameters from one or more of the ultrasonic probes 404 as a function of time or another parameter related to time. The acquired testing parameters can include one or more of an ultrasonic probe amplification, a number of flaws counted by an ultrasonic probe, and a signal level of an ultrasonic probe. The condition monitor 402 can be further configured to identify a predetermined deviation based upon one or more received testing parameters and, in response to identification of the predetermined deviation, can generate an indication.

In certain embodiments, the predetermined deviation can be identified when a difference between two sets of measurements of an ultrasonic testing parameter acquired by a single ultrasonic probe 404 exceed a predetermined threshold. As an example, a first measurement set can be currently acquired measurements of the testing parameter and a second measurement set can be previously acquired measurements of an ultrasonic testing parameter (e.g., historical measurements). The condition monitor 402 can receive a first signal including data characterizing the currently acquired testing parameter measurements and a second signal including data characterizing the previously acquired testing parameter measurements. The first and second signals can be received directly from the ultrasonic probe 404 and/or from another computing device (e.g., the diagnostic device 114 and/or another a data storage device in communication with the ultrasonic probes 404).

In other embodiments, the predetermined deviation can be identified when a difference between two sets of measurements of an ultrasonic testing parameter acquired by different ultrasonic probes 404 (e.g., two or more ultrasonic probes 404) exceeds a predetermined threshold (e.g., at a given time or over a time interval). As an example, a first measurement set can be currently acquired measurements of a selected one of the series of ultrasonic probes 404' and the second measurement set can be previously and/or currently acquired measurements of at least one other ultrasonic probe 404 of the series of ultrasonic probes (e.g., different from the selected ultrasonic probe 404). The condition monitor 402 can receive a first signal including data characterizing the currently acquired testing parameter measurements of the selected ultrasonic probe 404 and a second signal including data characterizing the previously and/or previously acquired testing parameter measurements from others of the series of ultrasonic probes 404'. The first and second signals can be received directly from the ultrasonic probe 404 and/or from another computing device (e.g., the diagnostic device 114 and/or another a data storage device in communication with the ultrasonic probes 404).

In further embodiments, the condition monitor 402 can identify the predetermined deviation based upon a trend in acquired measurements of an ultrasonic parameter of a single ultrasonic probe 404. As an example, a trend can be a slope of a measured ultrasonic testing parameter as a function of time. Under certain circumstances, the predetermined deviation can be identified when a positive or negative trend line exhibits a slope exceeding a predetermined amount. The trend line can be established from the acquired ultrasonic parameter measurements using a curve fit (e.g., linear, polynomial, exponential, etc.).

Should the condition monitor 402 determine that the predetermined deviation is present, the condition monitor 402 can be further configured to generate an indication. The indication can include one or more of a text message, an audio indication (e.g., an audible alarm) and a visual indication (e.g., a flashing light). In certain embodiments, the condition monitor can display the indication. In other embodiments, the condition monitor can transmit the indication to another system for display and/or storage.

Condition Monitoring Based Upon Probe Amplification

In general, each of the ultrasonic probes 404 can be calibrated prior to use. The calibration can include an amplification calibration. For each dimension of the target 104 that is tested, the calibration process can be performed using a reference standard. The reference standard can be positioned at a reference distance from the ultrasonic probes 404 and an amplification value applied to the incident signals 112$i$ of each of the ultrasonic probes 404 can be adjusted such that an amplitude of the corresponding return signals 112$r$ is approximately equal to a reference amplitude.

The amplification values for each of the ultrasonic probes 404 can be output as signals (e.g., 406$s$, 410$s$, 412$s$) containing data characterizing the amplification values at predetermined time intervals. In certain embodiments, as shown in FIG. 4, amplification signals 406$s$ can be output to the condition monitor 402. In other embodiments (not shown), the amplification signals can be transmitted to the diagnostic device 114 and/or a data storage device for storage and later retrieved by the condition monitor (not shown).

Figure 5:
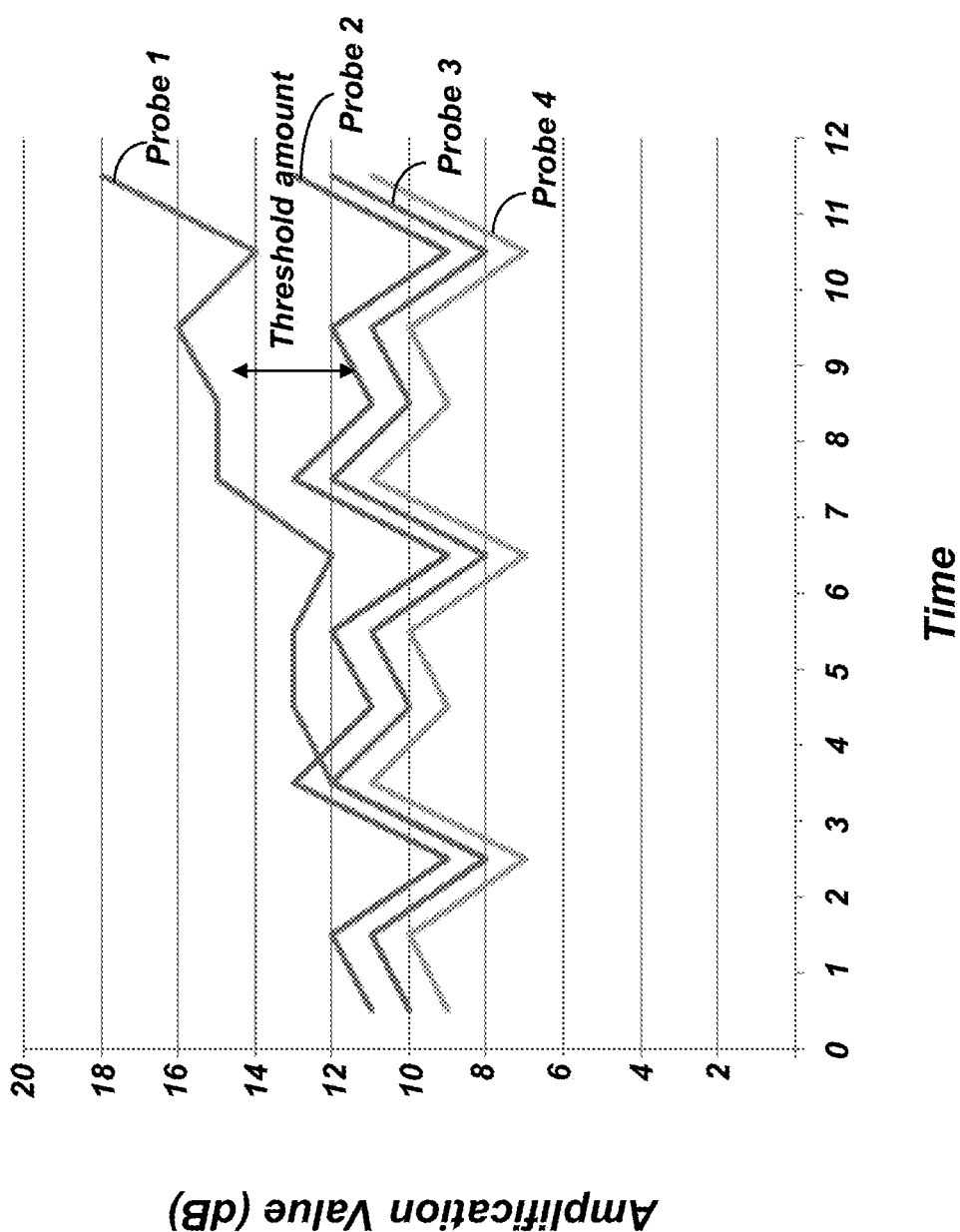
FIG. 5 is an exemplary plot of an ultrasonic probe amplification as a function of time for a series of four ultrasonic probes.

The condition monitor 402 can subsequently construct amplification curves of amplification value as a function of time for each of the ultrasonic probes 404. Exemplary amplification curves for a series of ultrasonic probes 404' performing the same test task (same adjustment group) over time is illustrated in FIG. 5. As shown, the series of ultrasonic probes 404' includes four ultrasonic probes 404, Probes 1, 2, 3, and 4.

The amplification curves can be utilized by the condition monitor 402 to identify deterioration of at least one of Probes 1, 2, 3, and 4. In an embodiment, if the amplification value of one of the ultrasonic probes at a given time differs from that of one or more of the others of the ultrasonic probes 404, by a predetermined threshold amount, the condition monitor 402 can be configured to identify this as the predetermined deviation. As shown, the amplification curve for ultrasonic Probe 1 differs from the amplification curves for the other ultrasonic probes 404, Probes 2, 3, and 4, by greater than the threshold amount from about time index 9 and onward. Thus, the condition monitor 402 can identify Probe 1 as exhibiting a predetermined deviation and can generate an indication to inform an operator.

Condition Monitoring Based Upon Flaw Counting

During ultrasonic testing of the target 104, each of the ultrasonic probes 404 can maintain a count of detected flaws. By statistics, after testing many targets 104 (e.g., thousands) when the ultrasonic probes 404 perform the same test job, they can be expected to each detect approximately the same number of flaws. Thus, when one of the series of ultrasonic probes 404' detects significantly more or less flaws than others of the series of ultrasonic probes 404', this occurrence can indicate a bad setting for that ultrasonic probe 404 or failure of that ultrasonic probe 404.

The flaw counts measured by each of the ultrasonic probes 404 can be output as signals (e.g., 406$s$, 410$s$, 412$s$) containing data characterizing a measured number of flaw counts as a function of time. The condition monitor 402 can subsequently construct flaw count curves, representing number of flaw counts as a function of time for each of the ultrasonic probes 404, for monitoring the test ultrasonic probe. A trend for a given flaw count curve can also be determined using a curve fit, such as a linear curve fit.

In one aspect, a deteriorating ultrasonic probe 404 can be identified from a trend in measured flaw count as a function of time. As an example, when the flaw count as a function of time for a selected ultrasonic probe 404 exhibits a slope having a magnitude greater than a predetermined threshold slope, the condition monitor can identify this as the predetermined deviation indicative of deterioration and generate an indication. As an example, when the condition monitor determines that a slope occurs, (e.g., a negative trend line), it can identify the selected ultrasonic probe 404 as having experienced deterioration and generate an indication.

Condition Monitoring Based Upon Average Amplitude Signal Level

When calibrating an ultrasonic probe 404, an operator can set a return signal amplitude to achieve a predetermined signal strength for return signals with respect to a reference reflector (e.g., 80% full screen height or FSH). Under some circumstances, a signal to noise ratio (S/N) of an ultrasonic probe 404 can worsen over time when experiencing deterioration. Thus, when calibrating the return signals to this predetermined signal strength, the noise level can increase as well.

An average signal strength level of return signals 412r acquired by an ultrasonic probe 404 during a production test (e.g. without reference to another of the series of ultrasonic probes 404') can be provided to the condition monitor 402. The condition monitor 402 can further determine a trend (e.g., by a curve fit) in the measured return signal strength-time behavior (e.g., positive or negative slope). Should the signal strength-time trend line exhibit a slope having a magnitude greater than a predetermined amount, the condition monitor 402 can identify this slope as the predetermined deviation.

Figure 6:
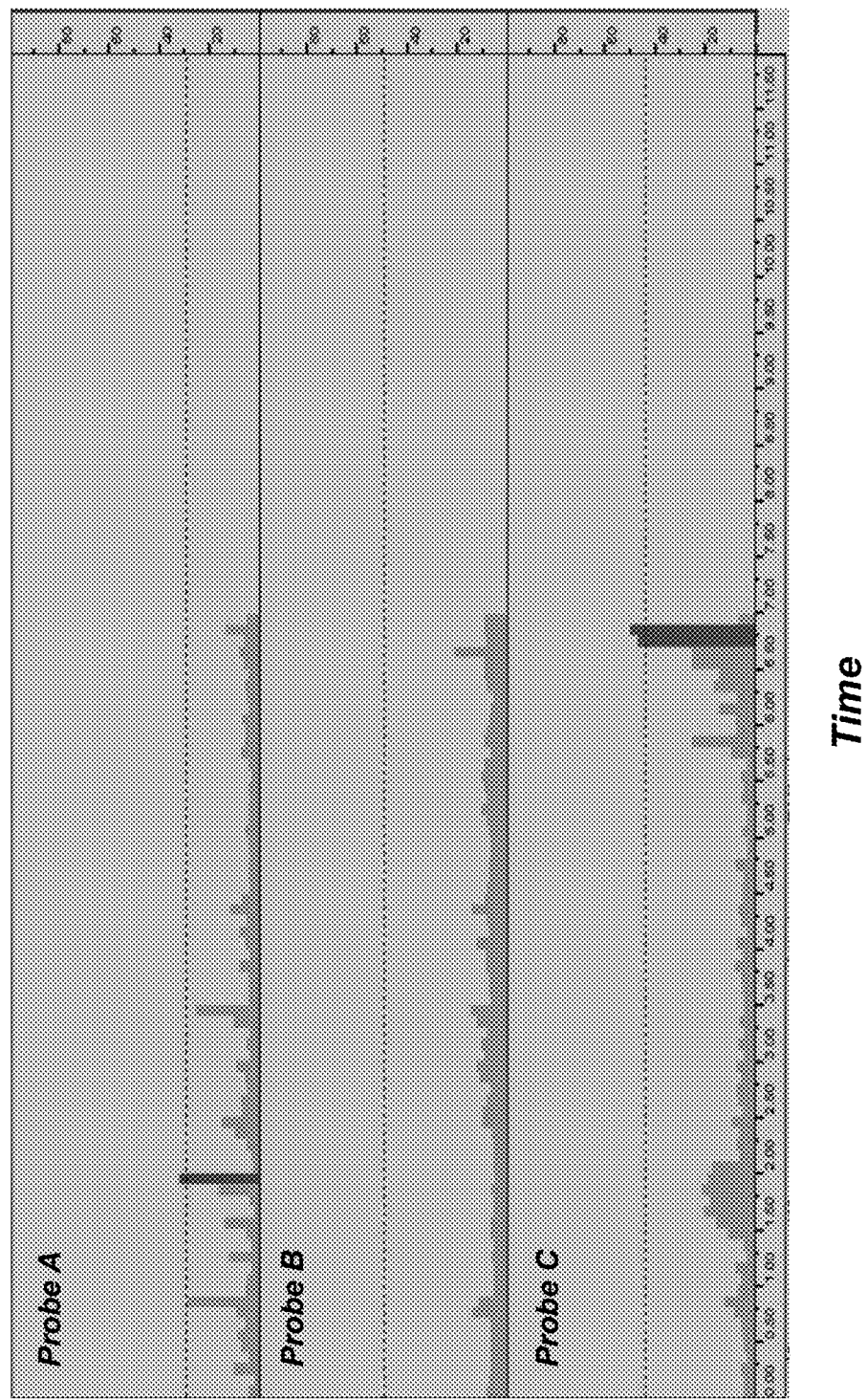
FIG. 6 is an exemplary plot of amplitude as a function of time for return signals measured by three ultrasonic probes.

Exemplary plots illustrating amplitude signals acquired by the series of ultrasonic probes 404' for a single target 104 are illustrated in FIG. 6. As shown, the series of ultrasonic probes 404' includes three ultrasonic probes 404, Probe A, Probe B, and Probe C and corresponding amplitude signals measured by each of the ultrasonic probes (e.g., A, B, C) for each tested target 104.

In general, a negative trend curve (negative slope) for the average signal strength of an ultrasonic probe, can be an indication that this ultrasonic probe is polluted and not able to properly perform ultrasonic testing. Alternatively, a positive trend curve (positive slope) for the average amplitude measured by an ultrasonic probe can indicate deterioration of the ultrasonic probe (e.g., a worse signal to noise ratio).

Condition Monitoring Based Upon Combinations of Testing Parameters

In further embodiments, when one of the series of ultrasonic probes 404' deteriorates, its amplification can be increased to compensate for the attendant loss in sensitivity. It can be beneficial to avoid replacing an ultrasonic probe exhibiting deterioration (e.g., for cost savings), provided that it exhibits a signal to noise ratio (S/N) that is high enough to perform ultrasonic testing and detect all flaws in the target. Therefore, in order to improve the ability of the condition monitor 402 to correctly identify deteriorating ones of the series of ultrasonic probes 404', two or more of the testing data (e.g., probe amplification, detected flaws, and average signal level) can be used by the condition monitor 402 to monitor for deterioration of the ultrasonic probes 404.

Figure 7:
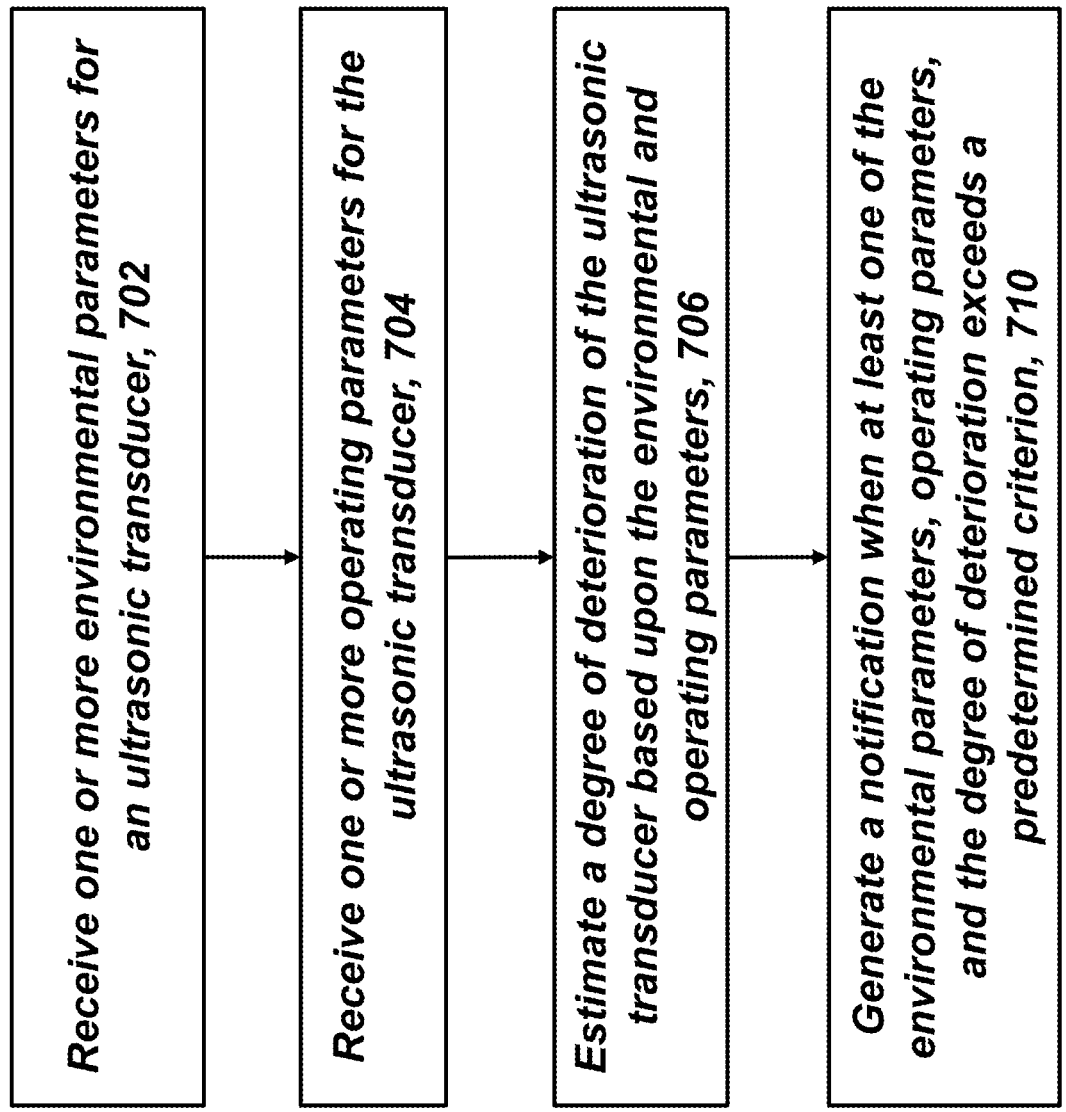
FIG. 7 is a flow diagram illustrating an exemplary embodiment of a method for condition monitoring an ultrasonic device.

FIG. 7 illustrates one exemplary embodiment of a method for condition monitoring of an ultrasonic transducer based upon measurements of environmental parameters and operating parameters of the ultrasonic transducer. In certain embodiments, the method 700 can be performed by the condition monitoring system 106 of FIG. 1.

In operation 702, measurements of one or more environmental parameters of the ultrasonic transducer 112 can be received by the analyzer 120. The measurements can be in the form of an environmental signal 122. The environmental signals 122 can be received from the ultrasonic transducer 112 and/or another computing device, such as the diagnostic device 114 or another data storage device. The ultrasonic transducer 112 can include two or more ultrasonic transducers. In certain embodiments, the two or more sensors can be positioned in a phased array configuration. That is, the at least two ultrasonic probes 404 can be spaced apart from one another and configured to emit incident signals 112i having a predetermined phase difference based upon their relative positions. In certain embodiments, the environmental parameters can be measured continuously (e.g., during operation of the ultrasonic probe 110 and between operation of the ultrasonic probe 110).

The environmental parameter measurements can be in the form of one or more environmental signals 122s output by sensor S. The environmental parameters can include at least one of temperature of the ultrasonic transducer, pressure of the ultrasonic transducer, vibration of the ultrasonic transducer, impact/shock experienced by the ultrasonic transducer, and humidity of the ultrasonic transducer.

In operation 704, data characterizing measurements of one or more operating parameters of the ultrasonic transducer 112 can be received by the analyzer 120. The measurements can be in the form of the one or more operating signals 124s output by the ultrasonic transducer 112. In certain embodiments, the one or more operating parameters include at least one of an operating time of the ultrasonic transducer, a storage time of the ultrasonic transducer, and one or more electrical properties of the ultrasonic transducer. The electrical properties can include at least one of an electrical impedance of the ultrasonic transducer and an initial pulse received by of the ultrasonic transducer.

In further embodiments, the one or more operating parameters can include one or more ultrasonic scans of the ultrasonic transducer 112 acquired by the ultrasonic probe 126. That is, the ultrasonic probe 126 does not include the ultrasonic transducer 112.

In certain embodiments, the method 700 can include measuring the one or more operating parameters. Prior to measuring the one or more operating parameters, a reproducible test environment can be established. As an example, following completion of the ultrasonic testing cycle, coupling fluid C can be drained from the chamber 116 and a defined test environment (e.g., a reproducible test environment) can be prepared by directing the air stream 202 over one or more surfaces of the housing 204 of the ultrasonic probe 110. As a result, material present on the surface of the housing 204 (e.g., fluid couplant C) that could undesirably reflect ultrasonic echoes when acquiring electrical properties measurements of the ultrasonic transducers 112, and/or ultrasonic scans of the ultrasonic transducers 112, can be removed from one or more surfaces of the ultrasonic probe 110.

In operation 706, the degree of deterioration of the transducer can be estimated by the analyzer 120 based upon the received environmental parameters and operating parameters. In certain embodiments, the analyzer 120 can be configured to estimate the degree of deterioration by input of the received environmental parameters and operating parameters into a deterioration model. The deterioration model can include an aging model.

In operation 710, an indication can be generated by the analyzer 120 based upon comparison of a selected one of the measured environmental parameters, the measured operational parameters, and the estimated degree of deterioration to at least one predetermined criterion. The predetermined criterion can be a predetermined threshold. As an example, the indication can be generated by the analyzer 120 when at least one of the measured environmental parameters, the measured operating parameters, and the determined degree of deterioration exceeds a predetermined threshold.

FIG. 8 illustrates one exemplary embodiment of a method for condition monitoring of an ultrasonic probe. In certain embodiments, the method 800 can be performed by the condition monitor 402 of FIG. 4.

In operation 802, the condition monitor 402 can receive at least two measurements of a predetermined ultrasonic testing parameter as a function of time. As an example, the first measurement can be received by the condition monitor 402 in the form of a first signal including data characterizing current measurements of a predetermined ultrasonic testing parameter acquired by a first ultrasonic probe as a function of time. The second measurement can be received by the condition monitor 402 in the form of a second signal include at least one of data characterizing prior measurements of the predetermined testing parameter acquired by the first ultrasonic probe as a function of time and data characterizing current or prior measurements of the predetermined testing parameter as a function of time acquired by one or more second ultrasonic probes, different from the first ultrasonic probe. In an non-limiting embodiment, the predetermined testing parameter can be selected from probe amplification, a number of flaws counted, and an average amplitude of measured return signals 112*r*. However, different or additional testing parameters can be employed without limit.

In operation 804, a predetermined deviation between the measured testing parameters characterized by the first and second signals can be identified by the condition monitor 402. Embodiments of the predetermined deviation can vary. In one aspect, the predetermined deviation can be a difference exceeding a threshold amount between the measured testing parameter s characterized by the first and second signals. In another aspect, the predetermined deviation can be a difference exceeding a threshold amount between respective trend lines of the measured testing parameter characterized by the first and second operating signals.

In operation 806, the condition monitor 402 can generate an indication in response to identification of the predetermined deviation. As discussed above, the indication can be one or more of an alpha-numeric message, an audio indication, and a visual indication. In certain embodiments, the indication can be displayed by the condition monitor 402. Alternatively or additionally, the indication can be transmitted to another computing device for storage, display and/or annunciation.

In certain embodiments, identification of the predetermined deviation in operation 802 and the indication generation in operation 806 can be performed immediately after acquisition of the first and second signals (e.g., online analysis). In other embodiments, identification of the predetermined deviation in operation 802 and the indication generation in operation 806 can be performed at a time after acquisition of the first and second signals (e.g., offline).

Exemplary technical effects of the methods, systems, and devices described herein include, by way of non-limiting example, condition monitoring of ultrasonic probes and ultrasonic probe transducers. In one aspect, measurements of environmental conditions and/or operating parameters can be employed in conjunction with deterioration models and predictive failure models to estimate a degree of deterioration and/or end of life of an ultrasonic transducer. In another aspect, ultrasonic probe deterioration can be tracked based upon comparison of testing parameters acquired during calibration and/or operation of two or more ultrasonic probes, such as probe amplification, counted flaws, and/or average probe amplification. In this manner, deterioration of ultrasonic probes and/or ultrasonic probe transducers can be identified and preventative maintenance can be performed before total outage of the ultrasonic probe or ultrasonic probe transducer.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Certain exemplary embodiments are described to provide an overview of the principles of the structure, function, manufacture, and use of the systems, devices, and methods disclosed herein. One or more examples of these embodiments are illustrated in the accompanying drawings. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method for condition monitoring of an ultrasonic device, comprising:
   receiving, at an analyzer, at least one environmental signal including data characterizing measurements of one or more environmental parameters of one or more ultrasonic transducers acquired by one or more sensors;
   receiving, at the analyzer, at least one operating signal including data characterizing measurements of one or more operating parameters of the one or more ultrasonic transducers;
   estimating, by the analyzer, a degree of deterioration of the one or more ultrasonic transducers by input of the received environmental parameters and operating parameters into a deterioration model; and
   generating, by the analyzer, an indication when at least one of the measured environmental parameters, the measured operating parameters, and the determined degree of deterioration exceeds a predetermined threshold.

2. The method of claim 1, further comprising measuring the one or more environmental parameters.

3. The method of claim 2, wherein the environmental parameters include at least one of temperature of the one or more ultrasonic transducers, pressure of the one or more ultrasonic transducers, vibration of the one or more ultrasonic transducers, shock experienced by the one or more ultrasonic transducers, and humidity of the one or more ultrasonic transducers.

4. The method of claim 1, wherein the one or more operating parameters include at least one of an operating time of the one or more ultrasonic transducers, a storage time of the one or mOre ultrasonic transducers, and one or more electrical properties of the one or more ultrasonic transducers.

5. The method of claim 4, wherein the electrical properties comprise at least one of an electrical impedance of the one or more ultrasonic transducers and an initial pulse received by the one or more ultrasonic transducers.

6. The method of claim 1, wherein the operating parameter measurements comprise one or more ultrasonic scans of the one or more ultrasonic transducers acquired by an ultrasonic probe that does not include the one or more ultrasonic transducers.

7. The method of claim 4, further comprising measuring the one or more operating parameters.

8. The method of claim 7, further comprising directing an air stream on one or more surfaces of a housing enclosing the one or more ultrasonic transducers prior to measuring the one or more operating parameters.

9. The method of claim 1, wherein the deterioration model includes an aging model.

10. The method of claim 1, wherein the one or more ultrasonic transducers includes at least two ultrasonic transducers spaced apart from one another and configured to emit incident signals having a predetermined phase difference based upon their relative positions.

* * * * *